March 27, 1934.   A. O. SCHAEFER   1,952,946
FOOD CHOPPER
Filed Oct. 28, 1932
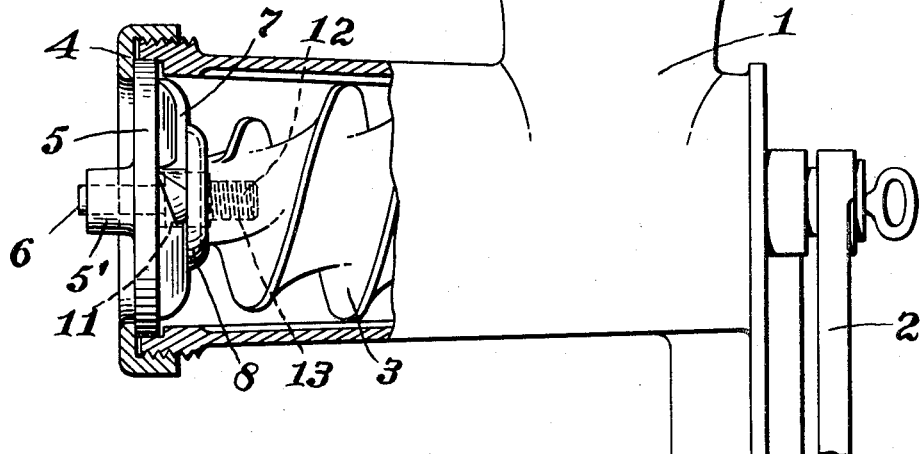
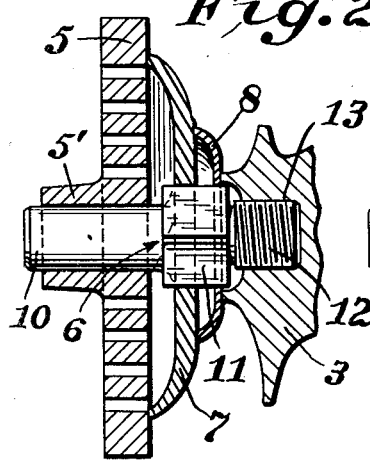 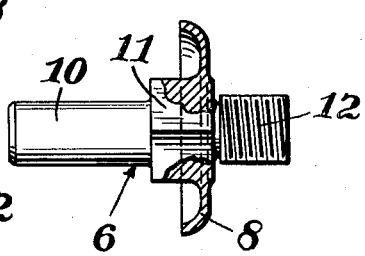 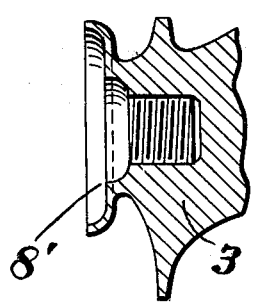
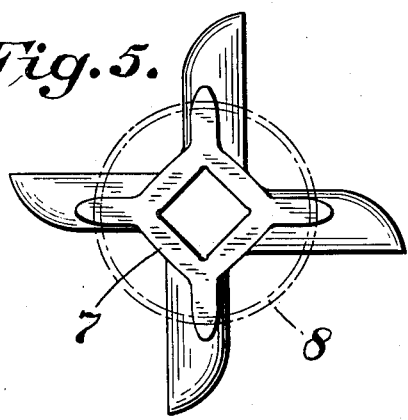 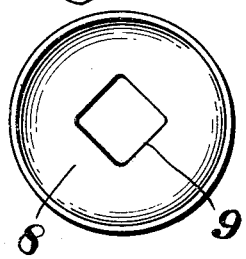 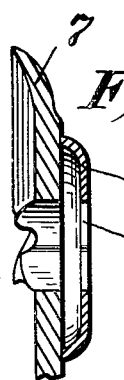
Inventor:
Adolph O. Schaefer,
By Parker Cook
Attorney Patented Mar. 27, 1934

1,952,946

UNITED STATES PATENT OFFICE 1,952,946

FOOD CHOPPER

Adolph O. Schaefer, Brooklyn, N. Y., assignor to Atlantic Service Company, Inc., Brooklyn, N. Y., a corporation of New York Application October 28, 1932, Serial No. 640,072

4 Claims. (Cl. 146—189)

My invention relates to new and useful improvements in food choppers, and has for an object to provide means wherein the pressure exerted against the knife to hold the same tightly against the plate will be more evenly distributed than with the food choppers now in use.

It is the general practice to provide a three or four-bladed knife that bears against the inner surface of the plate to properly cut the meat before being forced through the holes in the plate. However, certain difficulties are experienced, in that the pressure on the knife being exerted about the hub of the knife causes the cutting edges of the blades to wear unevenly or causes the surface of the plate to wear unevenly and the meat is not, therefore, cut as cleanly as it should be.

It is, of course, very desirable to cleanly cut the meat rather than to tear or crush it, as torn or crushed meat will discolor.

It is also the general practice to keep pulling the knife more tightly up against the plate as the knife wears, but the ends of the blades adjacent the hub become worn more quickly than the outer ends of the blades and there is not the perfect contact of the blades throughout their length with the plate, which is necessary for the sharp, clean-cutting of meat.

One of the objects, therefore, of the present invention is to use the ordinary form of knife or the ordinary form of knife with a slight change, and to provide a means for exerting pressure on the blades of the knife about midway their length rather than just at the hub, so that the cutting edges of the several blades will wear down in a more even manner and, at the same time, cause the outer ends of the blades to be tightly pressed against the surface of the plate, as well as the inner ends of the knife that are adjacent the hub.

Still another object of the invention is to provide a food chopper wherein heavy spring cupped means may be inserted between the worm and the knife and bear on the blades about midway their length, so that the pressure on the knife will be more evenly distributed than heretofore to thus assure perfect contact of the cutting edges of the knife throughout the length of the blades.

Still another object of the invention is to provide a metal cup-shaped member that will bear about its periphery against the blades of the knife and about midway their length, and which cup member may be either spot-welded to the knife, may be loose on the stud or formed integral with the same, or may be formed integral with the one end of the worm, so that under the distributed pressure, the knife blades will contact at all times throughout their length with the surface of the plate. Then, as the blades wear, the knife may be drawn up against the plate or the plate forced against the knife, so that an evenly distributed pressure is exerted throughout the length of the knife blades during their natural usefulness.

With these and other objects in view, the invention consists in certain new and novel arrangements and combination of parts, as will be hereinafter more fully described and pointed out in the claims.

Referring now to the drawing showing a preferred embodiment,

Fig. 1 is a fragmentary side elevation of a food chopper, parts being shown in section for the sake of clearness;

Fig. 2 is an enlarged fragmentary vertical section showing the plate, knife, and the means for evenly distributing the pressure on the blades against the plate;

Fig. 3 is a fragmentary detail section showing how the cup-shaped member might be formed integral with the stud;

Fig. 4 is a fragmentary detail section showing how the cup member might be formed integral with the end of the worm;

Fig. 5 is a top plan view of a knife showing how its upper surface may be ground for perfect contacting surface with the cup member;

Fig. 6 is a plan view of the cup member; and

Fig. 7 is a detail sectional view showing how the cup member may be spot-welded to the knife.

Referring now more particularly to the several views, and Fig. 1 for the moment, there is shown the food chopper 1 with its handle 2 and the helix or worm 3 and the clamping cap 4, which is to be threaded on the outer end of the barrel of the food chopper.

There may also be seen the plate 5, the stud 6, which latter is threaded into the worm 3, while mounted on the stud 6 may be seen the knife 7.

Now interposed between the rear surface of the knife and the worm is the member 8, which may also be seen in Fig. 6. This is preferably made of steel, is cup-shaped, slightly flattened on its outer surface, and is provided with the square opening 9. The depth of this member at its center is approximately a quarter of an inch and may be made out of steel stock of say one-sixteenth of an inch in thickness, although a lighter or heavier metal may be used.

As may be seen in the several figures, the stud 6 has the barrel or pintle 10 at its one end, which fits within the hub 5′ of the plate 5. There is also the square body portion 11 and it is on this portion that the member 8 may be fitted. The other end of the stud 12 is threaded to fit within the threaded portion of the worm 3.

Now this member might also be attached to the knife blade 7 by spot-welding its periphery to the several arms of the blade, so that the knife and member are then substantially an integral structure. By securing the member to the knife, the parts are not apt to become lost when the machine is taken apart.

If desired, however, as shown in Fig. 3, the member 8 might be sweated or formed integral with the stud 6, so that when the stud is in place, the periphery of the member will likewise bear against the blades midway their length to thus evenly distribute the pressure along the length of the several blades of the knife.

I have also found that there might be certain advantages in forming the member 8 as an integral part at the one end of the worm 3. In Fig. 4, a fragmentary end of the worm 3 is shown and either formed integral therewith or sweated thereto is the cup-shaped member 8'. In the same manner, the periphery of this cup-shaped member will bear against the rear surfaces of the several blades about midway their length and the pressure will thus be transferred evenly throughout the length of the blades.

It will be understood that the cup-shaped member 8 and 8' may be of such relatively thick metal that there will be but little, if any, resiliency or flexibility in this member. In other words, the member may be made very rigid to transfer the pressure from the hub to a point near midway the knife blades. On the other hand, the cup-shaped member 8 and 8' might be made of relatively thin material so that there will be a small amount of flexibility or resiliency in this cup-shaped member per se, and when it holds the knife blades against the plate, there will be no danger of the member breaking or fracturing.

From the foregoing, it will be seen that I have designed a food chopper wherein a means is provided for causing an even distribution of the pressure on the knife about midway the length of the blades, thus causing the knife to have a better cutting action. Furthermore, as the parts wear and are taken up, the knife blade edges will always present a close fit throughout their length with the plate.

Furthermore, as the cutting edges of the knife wear down or as the plate wears down and as the cap 4 is tightened, the knife blades throughout their length are pulled up evenly against the plate, thus assuring an even wearing of the cutting edges throughout the length of the blades.

I have found in actual practice that a food chopper when constructed as above shown and described will cut the meat more evenly than food cutters of the general type and have also found that distribution of the pressure to the blades in the manner described will enhance and lengthen the life or natural usefulness of both the blades and the plate.

Having thus described my invention, what I claim as new and desire to secure by Letters Patent is:

1. A food chopper including a barrel, a worm in said barrel, a plate at the end of the barrel, means for forcing the plate into the barrel, a knife operated by said worm, cupped means bearing on the back of the blades of the knife at points substantially midway the length of said blades and against the worm to thereby direct the pressure substantially throughout the length of the blades of said knife.

2. A food chopper consisting of a worm, a stud fitting within the end of the worm, a plate, a knife carried on said stud, the blades of which bear against the inner surface of the plate, spring means disposed between the worm and the knife and bearing against the rear surface of the knife at points remote from the hub to thereby hold the cutting edges of the knife throughout their length parallel with the inner surface of the plate.

3. A knife for food choppers including radial blades, the rear surface of the knife being flattened, a cup-shaped member having its periphery secured to the rear surfaces of the blades at points substantially midway the length of the blades.

4. A knife for food cutters having radial blades, the knife flattened on the surface opposite its cutting edges, a cup-shaped member the diameter of which is about half the diameter of the cutting knife, and the periphery of the cup-shaped member secured to the rear flattened surface of the knife.

ADOLPH O. SCHAEFER.